Patented June 13, 1944

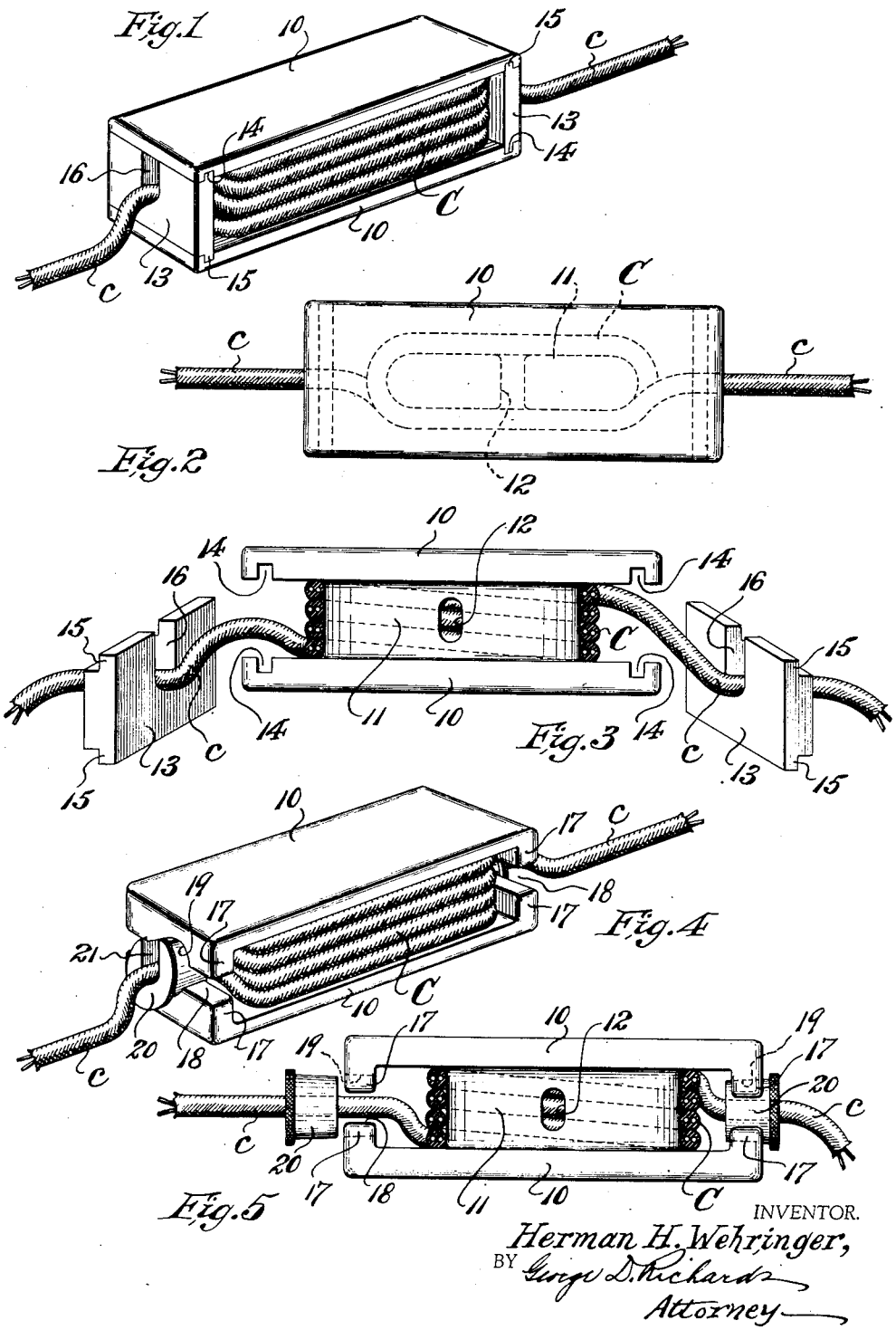

2,351,379

UNITED STATES PATENT OFFICE 2,351,379

SHORTENING TAKE-UP FOR CORDS OR THE LIKE

Herman H. Wehringer, Montclair, N. J.

Application November 18, 1942, Serial No. 465,985

3 Claims. (Cl. 24—71.2)

This invention relates to improvements in take-up means for flexible cables, cords or the like; and the invention has reference, more particularly, to a novel take-up means upon which may be wound a cable, cord, electric conductor or the like in order to shorten the operative length of the same by winding up and compactly storing such portion thereof as may be unnecessary for its operative extension from one given point, connection or device to another.

The invention has for an object to provide a simple and easily manipulated means upon which may be wound excess portions of the length of a cable, cord, electric conductor or the like to take up and compactly and neatly store the excess length thereof, not required for its operative extension from one given point, connection or device to another; said means comprising an elongated spool-like body formed by spaced rectangular, flat faced, flange members which are interconnected by an intermediate shank portion of reduced dimensions, and including detachable end elements engageable with and between aligned ends of said flange members, whereby to provide keeper means for retaining the cable, cord, electric conductor or the like, wound about the shank portion, against unwinding or like displacement.

Other objects of this invention, not at this time more particularly enumerated, will be understood from the following detailed description of the same.

Illustrative embodiments of this invention are shown in the accompanying drawing, in which:

Fig. 1 is a perspective view of one form of the novel take-up device according to this invention, with a cable or cord wound and stored thereon and secured against displacement therefrom; Fig. 2 is a plan elevational view of the same; and Fig. 3 is a side elevational view of the same, with the detachable end elements (shown in perspective) removed but applied to the cord end portions ready to be engaged with the ends of the device for closing the same.

Fig. 4 is a perspective view of another form of the novel take-up device according to this invention with a cable or cord operatively wound thereon; and Fig. 5 is a side elevational view thereof, with one detachable end element in place at one end thereof, and the other about to be applied to the opposite end thereof.

Similar characters of reference are employed in the hereinabove described views, to indicate corresponding parts.

In an illustrative form of the novel take-up device of this invention, as shown in Figs. 1 to 3 inclusive, the same comprises a body formed by parallelly spaced, flat faced flange members 10 of substantially rectangular shape and of suitable thickness. Extending between said flange members 10 is a central shank portion 11 of reduced dimensions, that is of substantially less length and width, whereby the body of the device is of spool-like form, with peripheral marginal portions, of substantial extent, overhanging the periphery of said shank portion 11. Said shank portion is provided with a centrally disposed transverse opening or slot 12, the purpose of which will be presently disclosed.

The spool-like body of the device can be variously made of suitable selected material, such as wood, metal, or plastic material; preferably, however, said body is folded in one piece from a suitable plastic material, such e. g. as a synthetic resin or resinoid plastic.

Illustrative of one use of the take-up device, the same may be employed to take up and store an excess portion of an electric conductor cord or cable C, such e. g. as one extending from an electrical outlet to a floor lamp or other electrical fixture or device, whereby to shorten the effective length of the cord or cable, and thus eliminate unnecessary slack in its extent from outlet to lamp, and likewise preventing, looping, twisting or other undesirable distortion of the cord or cable.

One method of applying the cord or cable C to the spool-like body of the take-up device consists in detaching one end of the cord or cable, as e. g. from the outlet from which it extends, and thereupon winding (as shown) so much thereof about the shank portion 11 and between the flange members 10 as may be required for desired reduction of its length.

If it is desired to apply to the take-up device a cord or cable C, neither end of which is readily detachable from the devices between which the same is connected, in such event, the slack of the cord or cable may be doubled upon itself, and the bight of the loop thereof thus formed may thereupon be inserted through the opening or slot 12 of the shank portion 11, thereafter winding up so much of the doubled portion of the cord or cable as may be required to reduce the extent of the same to a desired length.

Keeper means are provided for retaining the portions of the cord or cable C, which are wound onto the spool-like body, from unwinding, loosening or being otherwise displaced, in whole or in part, from wound and stored condition. Such keeper means comprises detachable end elements which are applicable to and between aligned ends of the flange members 10 of the spool-like body. One form and arrangement of such keeper means, as shown in Figs. 1 to 3 inclusive, comprises end plates 13 adapted to slidably engage in transverse guide channels or grooves 14 with which faces of the flange member end portions are provided. Preferably said end plates 13 are provided, at opposite marginal portions thereof, with guide tongues 15 to slidably fit said channels or grooves 14; but it will be understood that the specific form of detachable connection of said end plates to and between the flange member end portions is optionally subject to wide variation in kind. When the end plates 13 are operatively connected to and between the flange member end portions, so as to bridge the same, they will engage exteriorly extending portions c of the cord or cable C so as to obstruct any tendency to unwinding movement of the latter. In a preferred form of the end plates 13, the same are each provided with an indented slot 16 perpendicular to the planes of the flange members 10, in which slots the exteriorly extending portions c of the cord or cable C are lodged prior to attaching the end plates 13 to and between the flange members 10 (see Fig. 3), so that, when the former are engaged with the latter, the outwardly open ends of the slots 16 will be closed against escape of the cord or cable portions c (see Fig. 1). By such arrangement, not only will the cord or cable C be secured against displacement from the spool-like body of the take-up device, but these portions will extend substantially centrally or axially from the ends of the latter, and so as to hold the same substantially aligned with the length of the cord or cable.

Owing to the rectangular form of the spool-like body of the take-up device, the same will lie flat on a floor with no tendency to roll or shift about. For example, the take-up device, as applied to a cord or cable C, may be deposited on a floor in the angle formed thereby with an adjacent wall or wall base board, in which position it will remain out of the way, and little likely to be accidentally kicked about.

In Figs. 4 and 5 is shown another and somewhat modified form of the novel take-up device according to this invention, the same comprising the spaced flange members 10 and intermediate shank portion 11. In this form of the device, the end portions of aligned flange members are provided with end wall portions 17 extending therebetween. These end wall portions 17 are formed with cross slots 18 extending entirely therethrough from side to side thereof, and parallel to the planes of said flange members 10. Also formed in each end wall portion 17, to intersect the cross slot 18 thereof, is an end plug receiving or seating opening 19, in which may be detachably engaged an end plug 20. Preferably, said end plugs 20 are of tapered form so as to frictionally wedge into the openings 19 and across the cross slots 18, when operatively attached to the device; or, optionally, the end plugs and openings 19 may be cooperatively threaded so that the former may screw into the latter. Said end plugs 20 are each provided with a laterally indenting, outwardly open slot or opening 21.

When the end plugs 20 are removed, a cord or cable C may be passed through the open cross slots 18 and wound about the shank portion 11 and between the flange members 10. Exteriorly extending portions c of the cord or cable C are lodged in the end plug slots or openings 21 prior to applying said end plugs in place, so that, when said end plugs are entered and engaged in the receiving or seating openings 19, and positioned to dispose their slots or openings 21 perpendicular to the cross slots 18, said slots or openings 21 will be closed against escape of the cord or cable portions c, and the wound portions of the cord or cable C will thereupon be secured against unwinding or other displacement.

Having described my invention, I claim:

1. A device for the purposes described comprising a spool-like body formed by spaced rectangular flat faced flange members and an intermediate shank portion of substantially less length and width upon which windings of a cord or cable to be served are received and wound between said flange members, a closure element detachably engaged between aligned ends of said flange members at each end of the body, each said closure element having an indented slot to receive an outwardly extending portion of the wound cord or cable, and said slots being disposed perpendicular to the planes of the flange members whereby their open ends are closed against escape therefrom of the cord or cable extension, the closed ends of said slots being positioned in substantial alignment with the longitudinal axis of said body when said closure elements are operatively applied to the body ends, whereby to dispose said cord or cable extensions in substantially axial projection from the body ends and to retain the cord or cable portions wound upon the body against unwinding, loosening or like displacement, said body being adapted to lie flat upon a supporting surface without tendency to roll or shift about.

2. A device for the purposes described comprising a spool-like body formed by spaced rectangular flat faced flange members and an intermediate shank portion of substantially less length and width upon which windings of a cord or cable to be served are received and wound between said flange members, detachable end plates engageable between aligned ends of said flange members at each end of the body, and said flange member ends and said end plates having cooperative tongue and groove means for slidably engaging the latter with the former, whereby said end plates, when operatively applied to the body ends, retain the cord or cable portions wound upon the body against unwinding, loosening or like displacement, said body being adapted to lie flat upon a supporting surface without tendency to roll or shift about.

3. A device for the purposes described comprising a spool-like body formed by spaced rectangular flat faced flange members and an intermediate shank portion of substantially less length and width upon which windings of a cord or cable to be served are received and wound between said flange members, detachable end plates engageable between aligned ends of said flange members at each end of the body, said flange member ends and said end plates having cooperative tongue and groove means for slidably engaging the latter with the former, each said end plate having an indented slot to receive an outwardly extending portion of the wound cord or cable, and said slots being disposed perpendicular to the planes of the flange members whereby their open ends are closed against escape therefrom of the cord or cable extension, the closed ends of said slots being positioned in substantial alignment with the longitudinal axis of said body when said end plates are operatively attached to the body ends, whereby to dispose said cord or cable extensions in substantially axial projection from the body ends and to retain the cord or cable portions wound upon the body against unwinding, loosening or like displacement, said body being adapted to lie flat upon a supporting surface without tendency to roll or shift about.

HERMAN H. WEHRINGER.